United States Patent
Tiefensee et al.

[11] Patent Number: 6,087,449
[45] Date of Patent: Jul. 11, 2000

[54] THERMOPLASTIC MOULDING MATERIALS HAVING LITTLE HAZE

[75] Inventors: Kristin Tiefensee, Westheim; Rainer Neumann, Mutterstadt, both of Germany

[73] Assignee: BASF Aktiengesellschaft, Ludwigshafen, Germany

[21] Appl. No.: 09/029,556

[22] PCT Filed: Aug. 30, 1996

[86] PCT No.: PCT/EP96/03822

§ 371 Date: Feb. 6, 1998

§ 102(e) Date: Feb. 6, 1998

[87] PCT Pub. No.: WO97/08241

PCT Pub. Date: Mar. 6, 1997

[30] Foreign Application Priority Data

Aug. 31, 1995 [DE] Germany ............... 195 32 047
Aug. 31, 1995 [DE] Germany ............... 195 32 046

[51] Int. Cl.$^7$ ...................................... C08L 33/12
[52] U.S. Cl. .................. 525/228; 525/238; 525/242; 525/301; 525/310
[58] Field of Search .................. 525/228, 238, 525/242, 301, 310

[56] References Cited

U.S. PATENT DOCUMENTS

| | | | |
|---|---|---|---|
| 4,083,896 | 4/1978 | Moran et al. | |
| 4,393,164 | 7/1983 | Mckee et al. | 525/83 |
| 4,393,172 | 7/1983 | Lindner et al. | 525/310 |
| 4,607,080 | 8/1986 | Yusa et al. | 525/82 |
| 4,912,162 | 3/1990 | Kishida et al. | 525/67 |
| 5,312,575 | 5/1994 | Wills | 264/109 |
| 5,342,898 | 8/1994 | Seitz et al. | 525/81 |
| 5,373,060 | 12/1994 | Guentherberg et al. | 525/301 |
| 5,382,625 | 1/1995 | Lindner et al. | 525/81 |
| 5,457,157 | 10/1995 | Deckers et al. | 525/80 |
| 5,475,053 | 12/1995 | Niessner et al. | 525/64 |
| 5,576,385 | 11/1996 | Tiefensee et al. | 525/77 |
| 5,777,036 | 7/1998 | Fischer et al. | 525/285 |

OTHER PUBLICATIONS

Guenthenberg et al., WPIDS AN 96–140538, Abstracting DE 4431733 (1996).
Deckers et al., WPIDS AN 94–119550, Abstracting DE 4233386 (1994).

*Primary Examiner*—Jeffrey C. Mullis
*Attorney, Agent, or Firm*—Keil & Weinkauf

[57] ABSTRACT

The thermoplastic molding material contains a mixture of
(A) from 10 to 60% by weight of a methyl methacrylate polymer,
(B) from 10 to 70% by weight of a copolymer of a vinyl aromatic monomer and vinyl cyanide
(C) from 15 to 50% by weight of a graft copolymer obtainable from a core (C1) comprising a 1,3-diene and a vinyl aromatic monomer, a first graft shell (C2) comprising a vinyl aromatic monomer, a $C_1$–$C_8$-alkyl ester of methacrylic acid and a crosslinking monomer and a second graft shell (C3) comprising a $C_1$–$C_8$-alkyl ester of methacrylic acid and a $C_1$–$C_8$-alkyl ester of acrylic acid, and
(D) if required, conventional additives,
the stated percentages of A, B and C in the mixture summing to 100% by weight.

8 Claims, No Drawings

THERMOPLASTIC MOULDING MATERIALS HAVING LITTLE HAZE

The present invention relates to thermoplastic molding materials containing a mixture of (A) from 10 to 60% by weight of a methyl methacrylate polymer obtainable by polymerizing a mixture consisting of
  (A1) from 90 to 100% by weight, based on (A), of methyl methacrylate and
  (A2) from 0 to 10% by weight, based on (A), of a $C_1$–$C_8$-alkyl ester of acrylic acid
and
(B) from 10 to 70% by weight of a copolymer obtainable by polymerizing a mixture consisting of
  (B1) from 75 to 88% by weight, based on (B), of a vinylaromatic monomer and
  (B2) from 12 to 25% by weight, based on (B), of a vinyl cyanide
and
(C) from 15 to 50% by weight of a graft copolymer obtainable from
  (C1) from 40 to 80% by weight, based on (C), of a core obtainable by polymerizing a monomer mixture consisting of
    (C11) from 65 to 90% by weight of a 1,3-diene and
    (C12) from 10 to 35% by weight of a vinylaromatic monomer
and
  (C2) from 10 to 30% by weight, based on (C), of a first graft shell obtainable by polymerizing a monomer mixture consisting of (where the individual stated percentages C21, C22 and C23 sum to 100% by weight)
    (C21) from 30 to 60% by weight of a vinylaromatic monomer,
    (C22) from 40 to 60% by weight of a $C_1$–$C_8$-alkyl ester of methacrylic acid and
    (C23) from 0 to 2% by weight of a crosslinking monomer
and
  (C3) from 10 to 30% by weight, based on (C), of a second graft shell obtainable by polymerizing a monomer mixture consisting of
    (C31) from 70 to 98% by weight of a $C_1$–$C_8$-alkyl ester of methacrylic acid and
    (C32) from 2 to 30% by weight of a $C_1$–$C_8$-alkyl ester of acrylic acid,
the individual stated percentages of A, B and C in the mixture summing to 100% by weight, and
(D) if required, conventional additives in amounts of up to 20% by weight, based on the sum of the components A, B and C,
with the provisos that the ratio of (C2) to (C3) is from 2:1 to 1:2, the refractive index of the first graft shell ($n_D$-C2) is greater than the refractive index of the second graft shell ($n_D$-C3) and the refractive index of the total graft shell ($n_D$-C2+$n_D$-C3) is less than the refractive index of the core ($n_D$-C1), the magnitude of the difference between the refractive index of the total component C ($n_D$-C) and that of the total matrix ($n_D$-A+$n_D$-B) is less than or equal to 0.02.

The present invention furthermore relates to a process for the preparation of the novel thermoplastic molding materials, their use and the moldings obtainable therefrom.

EP-A 0 062 223 discloses highly glossy, transparent, impact-resistant, thermoplastic molding materials which consist of a hard methyl methacrylate polymer, a hard styrene/acrylonitrile polymer and a soft graft copolymer of alkyl (meth)acrylate and, if required, styrene on a rubber. The thermoplastic molding materials described also exhibit a good stress cracking resistance.

However, for some applications, inter alia for machine cover panels, for example in office machines or copiers, thermoplastic molding materials which, in addition to good flow behavior, also have high transmittance and little haze are required.

U.S. Pat. No. 4,083,896 likewise describes transparent blends of a hard methyl methacrylate polymer and a hard styrene/acrylonitrile polymer, which however are modified with rubbers comprising butadiene, acrylonitrile and styrene. Such transparent blends have a relatively high yellowness index, which is unacceptable for the abovementioned applications.

The rubbers used in EP-A 0 062 223 and based on a soft graft copolymer of alkyl (meth)acrylate are employed in particular for increasing the impact resistance. Such rubbers can also be used for modifying polyvinyl chloride (PVC) (EP-A 0 082 717, AU-A 9180-213 and DE-A 39 38 877).

Furthermore, GB-A 2 156 365 discloses that copolymers based on methyl methacrylate and styrene can be modified with a graft copolymer comprising butadiene, styrene and methyl methacrylate, this graft copolymer having only one graft shell. However, the blends obtained have an impact resistance which is not sufficiently high for some applications.

It is an object of the present invention to remedy the disadvantages described and to provide improved thermoplastic molding materials which have good impact resistance and good flow and are furthermore distinguished by high transmittance and little haze. In addition, the molding materials should be capable of being processed to give shaped articles which have very little edge yellowness.

We have found that this object is achieved by the thermoplastic molding materials defined at the outset. We have also found a process for their preparation, their use for the production of moldings, and moldings produced from the novel thermoplastic molding materials.

In preferred embodiments, the novel thermoplastic molding materials contain mixtures of
(A) from 20 to 50% by weight of a methyl methacrylate polymer obtainable by polymerizing a mixture consisting of
  (A1) from 92 to 98% by weight, based on (A), of methyl methacrylate and
  (A2) from 2 to 8% by weight, based on (A), of a $C_1$–$C_8$-alkyl ester of acrylic acid
and
(B) from 20 to 40% by weight of a copolymer obtainable by polymerizing a mixture consisting of
  (B1) from 79 to 85% by weight, based on (B), of a vinylaromatic monomer and
  (B2) from 15 to 21% by weight, based on (B), of a vinyl cyanide
and
(C) from 20 to 40% by weight of a graft copolymer obtainable from
  (C1) from 50 to 75% by weight, based on (C), of a core obtainable by polymerizing a monomer mixture consisting of
    (C11) from 70 to 85% by weight of a 1,3-diene and
    (C12) from 15 to 30% by weight of a vinylaromatic monomer
and (C2) from 10 to 25% by weight, based on (C), of a first graft shell obtainable by polymerizing a monomer mixture consisting of (where the individual stated percentages C21, C22 and C23 sum to 100% by weight)
(C21) from 40 to 50% by weight of a vinylaromatic monomer,
(C22) from 40 to 55% by weight of a $C_1$–$C_8$-alkyl ester of methacrylic acid and
(C23) from 0 to 1.2% by weight of a crosslinking monomer
and
(C3) from 10 to 25% by weight, based on (C), of a second graft shell obtainable by polymerizing a monomer mixture consisting of
(C31) from 75 to 92% by weight of a $C_1$–$C_8$-alkyl ester of methacrylic acid and
(C32) from 8 to 25% by weight of a $C_1$–$C_8$-alkyl ester of acrylic acid,
the individual stated percentages of A, B and C in the mixture summing to 100% by weight and
(D) if required, conventional additives in amounts of from 0 to 10% by weight, based on the sum of the components A, B and C.

The methyl methacrylate polymers (A) used in the novel thermoplastic molding materials are either homopolymers of methyl methacrylate (MMA) or copolymers of MMA with up to 10% by weight, based on (A), of a $C_1$–$C_8$-alkyl ester of acrylic acid.

Suitable $C_1$–$C_8$-alkyl esters of acrylic acid (component A2) are methyl acrylate, ethyl acrylate, propyl acrylate, n-butyl acrylate, n-pentyl acrylate, n-hexyl acrylate, n-heptyl acrylate, n-octyl acrylate and 2-ethylhexyl acrylate and mixtures thereof, preferably methyl acrylate, ethyl acrylate, n-butyl acrylate, 2-ethylhexyl acrylate or mixtures thereof, particulary preferably methyl acrylate.

The methyl methacrylate (MMA) polymers can be prepared by mass, solution or bead polymerization by known methods (cf. for example Kunststoff-Handbuch, Volume IX, Polymethacrylate, Vieweg/Esser, Carl-Hanser-Verlag 1975) and are commercially available. MMA polymers whose weight average molecular weights Mw are from 60,000 to 300,000 (determined by light scattering in chloroform) are preferably used.

The component (B) is a copolymer of a vinylaromatic monomer (B1) and vinyl cyanide (B2).

Suitable vinylaromatic monomers (component B1) are styrene, styrene which is monosubstituted to trisubstituted by $C_1$–$C_8$-alkyl, such as p-methylstyrene or tert-butylstyrene, and α-methylstyrene, preferably styrene.

Acrylonitrile and/or methacrylonitrile may be used as the vinyl cyanide (component B2), acrylonitrile being preferred.

Outside the abovementioned range of the composition of the component (B), opaque molding materials which have joint lines are usually obtained at processing temperatures above 240° C.

The copolymers (B) can be prepared by known processes, such as mass, solution, suspension or emulsion polymerization, preferably by solution polymerization (cf. GB-A 1 472 195). Copolymers (B) having molecular weights Mw of from 60,000 to 300,000, determined by light scattering in dimethylformamide, are preferred.

A graft copolymer comprising a core (C1) and two graft shells (C2) and (C3) applied thereon is used as component (C).

The core (C1) is the grafting base and has a swelling index SI of from 15 to 40, in particular from 20 to 35, determined by measurement of the swelling in toluene at room temperature.

Butadiene and/or isoprene may be used as 1,3-diene (component C11) of the core of the graft copolymer (component C1).

Styrene or a styrene substituted in the α position or, preferably, in the nucleus by one $C_1$–$C_8$-alkyl group (or in the nucleus also by a plurality of $C_1$–$C_8$-alkyl groups), preferably methyl, may be used as the vinyl-aromatic monomer (component C12).

The core of the graft copolymer preferably has a glass transition temperature of less than 0° C. The average particle size of the core is from 30 to 250 nm, particularly preferably from 50 to 180 nm. The core is usually prepared by emulsion polymerization (cf. for example Encyclopedia of Polymer Science and Engineering, Vol. 1, page 401 et seq.).

The graft shell (C2), which contains the monomers (C21), (C22) and, if required, (C23), is applied to the core (C1).

Styrene or a styrene substituted in the a position or, preferably, in the nucleus by one $C_1$–$C_8$-alkyl group (or in the nucleus also by a plurality of $C_1$–$C_8$-alkyl groups), preferably methyl, may be used as the vinyl-aromatic monomer (component C21).

According to the invention, methyl methacrylate (MMA), ethyl methacrylate, n-propyl methacrylate, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methacrylate or 2-ethylhexyl methacrylate, particularly preferably methyl methacrylate, or a mixture of these monomers is used as the $C_1$–$C_8$-alkyl ester of methacrylic acid (component C22).

Conventional crosslinking monomers may be used as monomers (C23), ie. essentially di- or polyfunctional comonomers, in particular alkylene glycol di(meth) acrylates, such as ethylene di(meth)acrylate, propylene di(meth)acrylate and butylene di(meth)acrylate, allyl methacrylate, (meth)acrylates of glycerol, trimethylolpropane or pentaerythritol, or vinylbenzenes, such as di- or trivinylbenzene.

A further graft shell (C3) which contains the monomers (C31) and (C32) is in turn applied to the graft shell (C2). The monomers (C31) are $C_1$–$C_8$-alkyl esters of methacrylic acid and the monomers (C32) are $C_1$–$C_8$-alkyl esters of acrylic acid.

According to the invention, methyl methacrylate (MMA), ethyl methacrylate, n-propyl methacrylate, isopropyl methacrylate, n-butyl methacrylate, isobutyl methacrylate, sec-butyl methacrylate, tert-butyl methacrylate, pentyl methacrylate, hexyl methacrylate, heptyl methacrylate, octyl methacrylate or 2-ethylhexyl methacrylate, particularly preferably methyl methacrylate, or a mixture of these monomers is used as the $C_1$–$C_8$-alkyl ester of methacrylic acid (monomers C31).

Methyl acrylate (MA), ethyl acrylate, propyl acrylate, n-butyl acrylate, isobutyl acrylate, sec-butyl acrylate, tert-butyl acrylate, pentyl acrylate, hexyl acrylate, heptyl acrylate, octyl acrylate or 2-ethylhexyl acrylate, particularly preferably methyl acrylate, or a mixture of these monomers with one another may be used as the $C_1$–$C_8$-alkyl ester of acrylic acid (monomers C32).

The two graft shells (C2) and (C3) are prepared in the presence of the core (C1) by methods known from the literature, in particular by emulsion polymerization (Encyclopedia of Polymer Science and Engineering, Vol. 1, page 401 et seq.). As a result of the seed method used, no new particles are formed in the preparation of the two graft shells. Moreover, the seed method makes it possible to determine the number and type of particles in the two grafting stages by means of the amount and type of the emulsifier used. The emulsion polymerization is usually initiated by polymerization initiators.

Ionic and nonionic emulsifiers may be used in emulsion polymerization. Suitable emulsifiers are, for example, dioctyl sodium sulfosuccinate, sodium lauryl sulfate, sodium dodecylbenzenesulfonate, alkylphenoxypolyethylenesulfonates and salts of long-chain carboxylic and sulfonic acids. Examples of suitable nonionic emulsifiers are fatty alcohol polyglycol ethers, alkylaryl polyglycol ethers, fatty acid monoethanolamides and ethoxylated fatty amides and fatty amines. The total amount of emulsifier is preferably from 0.05 to 5% by weight, based on the total weight of the emulsion graft copolymer.

The polymerization initiators used may be ammonium and alkali metal peroxodisulfates, such as potassium peroxodisulfate, and initiator combination systems, such as sodium persulfate, sodium hydrosulfite, potassium persulfate, sodium formaldehyde sulfoxylate and potassium peroxodisulfate, and sodium dithionite/iron(II) sulfate, and the polymerization temperature may be from 50 to 100° C. in the case of the ammonium and alkali metal peroxodisulfates to be thermally activated, and lower than this, for example from 20 to 50° C., in the case of the initiator combinations which are effective as redox systems. The total amount of initiator is preferably from 0.02 to 1.0% by weight, based on the prepared emulsion polymer.

Both in the preparation of the base, ie. of the core (C1), and in the preparation of the two grafts, ie. of the two graft shells (C2) and (C3), polymerization regulators may also be used. The polymerization regulators used include alkyl mercaptans, such as n-dodecyl mercaptan or tert-dodecyl mercaptan. The polymerization regulators are usually used in an amount of from 0.01 to 1.0% by weight, based on the particular stage.

Moreover, the emulsion graft copolymer to be used according to the invention is prepared by initially taking an aqueous mixture consisting of monomers, crosslinking agent, emulsifier, initiator, regulator and a buffer system in a reactor blanketed with nitrogen, establishing inert conditions at room temperature while stirring and then bringing the mixture to the polymerization temperature in the course of from 15 to 120 minutes. Polymerization is then effected to a conversion of at least 95%. Monomers, crosslinking agent, emulsifier, initiator and regulator may also be added to the initially taken aqueous system completely or partially as a feed.

If necessary after a subsequent reaction time of from 15 to 120 minutes, the stages (C2) and (C3) are produced while feeding the monomers in the presence of the preformed stage (C1) by emulsion polymerization.

The emulsion graft copolymer is isolated from the resulting latex in a known manner by precipitation, filtration and subsequent drying. For example, aqueous solutions of inorganic salts, such as sodium chloride, sodium sulfate, magnesium sulfate and calcium chloride, aqueous solutions of salts of formic acid, such as magnesium formate, calcium formate and zinc formate, aqueous solutions of inorganic acids, such as sulfuric and phosphoric acid, and aqueous ammoniacal and amine solutions and other aqueous alkaline solutions, for example of sodium hydroxide and potassium hydroxide, may be used for the precipitation.

The drying can be carried out, for example, by freeze-drying, spray-drying, drying in a fluidized bed and drying in a through-circulation oven.

The graft copolymer (C) preferably has a swelling index SI of from 10 to 40, in particular from 12 to 35. The swelling index is determined by measuring the swelling in toluene at room temperature.

Suitable conventional additives (D) are all those substances which readily dissolve in the components (A), (B) and (C). Suitable additives are colorants, stabilizers, lubricants and antistatic agents.

The components (A), (B), (C) and, if desired, (D) are usually mixed by the process, likewise according to the invention, in the melt at from 200 to 300° C., in particular from 200 to 280° C.

The novel thermoplastic molding materials are furthermore distinguished by, inter alia, the fact that the ratio of the first graft shell (C2) to the second graft shell (C3) is from 2:1 to 1:2 and the refractive index of the first graft shell ($n_D$-C2) is greater than the refractive index of the second graft shell ($n_D$-C3). Preferably, the refractive index of the first graft shell ($n_D$-C2) is at least 2%, in particular at least 3%, greater than the refractive index of the second graft shell ($n_D$-C3).

Furthermore, the novel thermoplastic molding materials are distinguished by, inter alia, the fact that the refractive index of the total graft shell ($n_D$-C2+$n_D$-C3) is less than the refractive index of the core ($n_D$-C1). Preferably, the refractive index of the total graft shell ($n_D$-C2+$n_D$-C3) is at least 0.1%, in particular at least 1.0%, less than the refractive index of the core ($n_D$-C1). It must also be ensured that the magnitude of the difference between the refractive index of the total component C ($n_D$-C) and that of the total matrix ($n_D$-A+$n_D$-B) is less than or equal to 0.02, in particular less than or equal to 0.015.

In a further embodiment of the novel molding materials, the magnitude of the difference between the refractive index of the total graft shell ($n_D$-C2 +$n_D$-C3) and that of the core ($n_D$-C1) is less than 0.03: [($n_D$-C2+$n_D$-C3)-$n_D$-C1] <0.03. The molding materials according to this embodiment have particularly low edge yellowness.

Moldings can be produced from the novel thermoplastic molding materials, mainly by injection molding or by blow molding. However, the thermoplastic molding materials can also be compression molded, calendered, extruded or vacuum formed. The novel thermoplastic molding materials are distinguished in particular by good stress cracking resistance and impact resistance and are transparent. Furthermore, they exhibit very little haze and no marked yellowness.

EXAMPLES

In the novel Examples 1 to 8 below and the Comparative Examples V1 to V10, thermoplastic molding materials were prepared and the following properties determined:

The refractive index $n_D^{25}$ was determined using an Abbé refractometer by the method for measuring the refractive indices of solids (cf. Ullmanns Encyklopädie der technischen Chemie, Volume 2/1, page 486, editor E. Foerst; Urban & Schwarzenberg, Munich-Berlin 1961).

Impact resistance $a_N$, according to ISO 179

Multiaxial impact resistance $W_g$, according to ISO 6603-2

Melt volume index MVI, according to DIN 53735

Transmittance t, according to DIN 5036 (2 mm)

Haze, according to DIN 5036 (2 mm)

Yellowness index YI, according to ASTM-D 1925

Edge yellowness, visual assessment of 2 mm thick circular disks

The impact resistance $a_N$ was tested by the Charpy method. In this test method, the standardized test specimen resting on two supports is destroyed or damaged by an impact directed at its middle. The energy (kJ) required for the destruction or damage is based on the critical cross-section (m$^2$) and defined as impact resistance $a_N$ (dimension kJ/m$^2$).

The light transmittance t (dimension %) is defined as the ratio of the light transmitted by a sample to the intensity of the incident light. It was determined as a function of the wavelength in a range from 400 to 900 nm on a 2 mm thick test specimen.

Transparent plastics in which optical transparency is essential with regard to the utility value are investigated for their haze. The haze (dimension %) is defined as that part of the light transmitted by a material sample which deviates from the direction of the light beam incident on the sample, owing to scattering taking place in the material. The haze is determined on a 2 mm thick test specimen.

The yellowness index YI is based on chromaticity coordinates which are calculated from the transmission spectrum according to ASTM-D 1925. Illuminant D65 and the wide-field standard observer are used as a basis.

Determination of the swelling index (SI) or of the gel content of the bases, ie. of the core (C1):

0.3 g of the rubber-like core (C1) are dissolved in 50 ml of toluene at room temperature and left for 24 hours. After the swelling agent has been stripped off, the wet gel is weighed and is dried to constant weight. The swelling index SI is then obtained as the quotient of the mass of the wet gel to the mass of the dry gel, and the gel content as the quotient of the mass of the dry gel to the sample weight times 100%.

The average particle size and the particle size distribution of the graft copolymers ($C^a$) to ($C^h$) were determined from the integral mass distribution. The average particle sizes in all cases are the weight average particle sizes as determined by means of an analytical ultracentrifuge by the method of W. Scholtan and H. Lange, Kolloid-Z, und Z.-Polymere 250 (1972), 782–796. The ultracentrifuge measurement gives the integral mass distribution of the particle diameter of a sample. From this it is possible to determine the percentage by weight of the particles which have a diameter equal to or less than a certain size. The average particle diameter, which is also referred to as the $d_{50}$ value of the integral mass distribution, is defined as the particle diameter at which 50% by weight of the particles have a diameter which is smaller than the diameter which corresponds to the $d_{50}$ value. Likewise, 50% by weight of the particles then have a diameter which is larger than the $d_{50}$ value.

The following graft copolymers (C), the preparation of which is described below, were used in the novel Examples 1 to 8 and the Comparative Examples V1 to V10:

All graft copolymers used here were prepared via the base (I), (II) or (III).

Base (I):

A solution of 186 parts by weight of water and 0.4 part by weight of a paraffin sulfonate was flushed with nitrogen, and a mixture of 73 parts by weight of butadiene, 27 parts by weight of styrene and 1 part by weight of tert-dodecyl mercaptan with 0.2 part by weight of potassium peroxodisulfate were added at 70° C. while stirring. Polymerization was carried out to a conversion of at least 95%.

The resulting core ($C1_I$) of the base (I) had an average diameter $d_{50}$ of 143 nm; its swelling index SI determined in toluene was 23 and its gel content was 88%.

Base (II):

The base (II) was prepared similarly to the base (I), but only butadiene was used instead of the mixture of butadiene and styrene.

The resulting core ($C1_{II}$) of the base (II) had an average particle diameter $d_{50}$ of 126 nm; its swelling index SI determined in toluene was 25 and its gel content was 85%.

Base (III):

A base (III) was prepared similarly to the base (I), but the mixture contained 76 parts by weight of butadiene and 24 parts by weight of styrene.

The resulting core ($C1_{III}$) of the base (III) had an average particle diameter $d_{50}$ of 135 nm; its swelling index SI determined in toluene was 23 and its gel content was 87%.

The graft copolymers ($C^a$) to ($C^c$) were prepared by two-stage graft copolymerization from the cores ($C1_I$ and $C1_{II}$) obtained from the bases (I) and (II). In the novel Examples 1, 2 and 3 and in the comparative polymers CV1 to CV7, this procedure was effected as described below.

The following abbreviations were used.

| Bu | Butadiene | MA | Methyl acrylate |
| S | Styrene | BDA | Butanediol diacrylate |
| MMA | Methyl methacrylate | BA | Butyl acrylate |

Graft copolymer $C^a$ 200 parts by weight of the base (I) were initially taken and blanketed with nitrogen, and 10.4 parts by weight of styrene, 9.4 parts by weight of MMA and 0.2 part by weight of BDA were added at 70° C. Furthermore, 0.1 part by weight of a paraffin sulfonate and 0.04 part by weight of potassium peroxodisulfate in 10 parts by weight of water were added to this emulsion. A first graft shell ($C2^a$) resulted.

After about 15 minutes, a further 8 parts by weight of MMA and 2 parts by weight of BA were added and polymerization was continued for 60 minutes, the second graft shell ($C3^a$) being obtained.

Graft copolymer $C^b$

A graft copolymer was prepared similarly to graft copolymer $C^a$, under the same conditions, in this case 10.4 parts by weight of styrene, 9.4 parts by weight of MMA and 0.2 part by weight of BDA being used for the preparation of the first graft shell ($C2^b$) and 16 parts by weight of MMA and 4 parts by weight of BA for the preparation of the second graft shell ($C3^b$), the amounts being based on 170 parts by weight of the base (I).

Graft copolymer $C^c$

A graft copolymer was prepared similarly to graft copolymer $C^a$, under otherwise identical conditions, in this case 5.2 parts by weight of styrene, 4.7 parts by weight of MMA and 0.1 part by weight of BDA being used for the preparation of the first graft shell ($C2^c$) and 16 parts by weight of MMA and 4 parts by weight of BA for the preparation of the second graft shell ($C3^c$), the amounts being based on 200 parts by weight of the base (I).

Comparative polymer CV1

A graft copolymer (CV1) was prepared similarly to novel graft copolymer $C^a$, under otherwise identical conditions, except that in this case 13 parts by weight of styrene, 11.7 parts by weight of MMA and 0.25 part by weight of BDA were used for the preparation of the first graft shell ($C2_{V1}$) and 4 parts by weight of MMA and 1 part by weight of BA for the preparation of a second graft shell ($C3_{V1}$), the amounts being based on 200 parts by weight of the base (I).

Comparative polymer CV2

A graft copolymer (CV2) was prepared similarly to novel graft copolymer $C^a$, under otherwise identical conditions, except that in this case 2.6 parts by weight of styrene, 2.35 parts by weight of MMA, 0.05 part by weight of BDA, 0.025 part by weight of a paraffin sulfonate and 0.01 part by weight of potassium peroxodisulfate were used for the preparation of a first graft shell ($C2_{V2}$) and then 20 parts by weight of MMA and 5 parts by weight of BA were used for the preparation of a second graft shell (C3$_{V2}$), the amounts being based on 200 parts by weight of the base (I).

Comparative polymer CV3

13 parts by weight of styrene, 2 parts by weight of BA and 15 parts by weight of MMA were added to 200 parts by weight of the base (I) at 70° C., and otherwise polymerization was completed similarly to Example 1. A second graft shell (C3) was not prepared.

Comparative polymer CV4

10.4 parts by weight of MMA, 9.4 parts by weight of styrene, 0.2 parts by weight of BDA, 0.1 part by weight of paraffin sulfonate and 0.04 part by weight of potassium peroxodisulfate were added to 170 parts by weight of the base (II) at 70° C. and were reacted in this manner, similarly to Example 1, to give the first graft shell (C2$_{V4}$). 10 parts by weight of styrene and 10 parts by weight of MMA were then polymerized with the first graft shell (C2$_{V4}$) at 70° C., resulting in a second graft shell (C3$_{V4}$).

Comparative polymer CV5

A graft copolymer (CV5) was prepared similarly to novel Example 1, except that only 10 parts by weight of MMA were used for the second graft shell.

Comparative polymer CV6

18 parts by weight of styrene, 2 parts by weight of BA and 0.2 part by weight of BDA were added to 170 parts by weight of the base (II) at 70° C. Furthermore, 0.1 part by weight of a paraffin sulfonate and 0.04 part by weight of potassium peroxodisulfate were added to this emulsion. A first graft shell (C2$_{V6}$) resulted.

After about 15 minutes, 10 parts by weight of styrene and 10 parts by weight of MMA are also added and polymerization was carried out again for 60 minutes, a second graft shell (C3$_{V6}$) being obtained.

Comparative polymer CV7

0.12 part by weight of paraffin sulfonate, 0.045 part by weight of potassium peroxodisulfate, 19.8 parts by weight of styrene and 2.2 parts by weight of BA were added to 155 parts by weight of the base (I) at 70° C. A first graft shell (C2$_{V7}$) resulted. 23 parts by weight of MMA were then added and polymerization was carried out for 60 minutes, a second graft shell (C3$_{V7}$) being obtained.

In the novel graft copolymers C$^a$ to C$^c$ and the comparative polymers CV1 to CV7, polymerization was carried out in each case for a further hour.

The graft copolymers C$^a$ to C$^c$ and CV1 to CV7 obtained were then isolated by precipitation and, after washing with water at 60° C., were dried for 24 hours under reduced pressure.

Table 1 below shows the particular compositions of the graft copolymers C$^a$ to C$^c$ and CV1 to CV7.

Table 1

Composition of the graft copolymers (C$^a$) to (C$^c$) and CV1 to CV7 in parts by weight in each case—

C$^a$: 70 of C1$_1$ (core) comprising 73 of Bu and 27 of S 20 of C2$^a$ (first graft shell) comprising 52 of S, 47 of MMA and 1 of BDA 10 of C3$^a$ (second graft shell) comprising 80 of MMA and 20 of BA C$^b$: 60 of C1$_1$ 20 of C2$^b$ comprising 52 of S, 47 of MMA and 1 of BDA 20 of C3$^b$ comprising 80 of MMA and 20 of BA C$^c$: 70 of C1$_I$ 10 of C2$^c$ comprising 52 of S, 47 of MMA and 1 of BDA 20 of C3$^c$ comprising 80 of MMA and 20 of BA CV1: 70 of C1$_I$ 25 of C2$_{V1}$ comprising 52 of S, 47 of MMA and 1 of BDA 5 of C3$_{V1}$ comprising 80 of MMA and 20 of BA CV2: 70 of C1$_I$ 5 of C2$_{V2}$ comprising 52 of S, 47 of MMA and 1 of BDA 25 of C3$_{V2}$ comprising 80 of MMA and 20 of BA CV3: 70 of C1$_I$ 30 of C2 comprising 43 of S, 50 of MMA and 7 of BA CV4: 60 of C1$_I$ 20 of C2$_{V4}$ comprising 47 of S, 52 of MMA and 1 of BDA 20 of C3$_{V4}$ comprising 50 of S and 50 of MMA, n$_D$-C2<n$_D$-C3

CV5: 70 of C1$_I$ 20 of C2$_{V5}$ comprising 52 of S, 47 of MMA and 1 of BDA 10 of C3$_{V5}$ comprising 100 of MMA CV6: 60 of C1$_{II}$ 20 of C2$_{V6}$ comprising 90 of S, 10 of BA and 1 of BDA 20 of C3$_{V6}$ comprising 50 of S and 50 of MMA CV7: 55 of C1$_I$ 22 of C2$_{V7}$ comprising 90 of S and 10 of BA 23 of C3$_{V7}$ comprising pure MMA A graft copolymer C$^a$ to C$^c$ or CV1 to CV7 was then each reacted in a melt at 250° C. with the components (A1) and (B1) to give thermoplastic molding materials.

The thermoplastic molding materials of the novel Examples 1 to 8 and of the Comparative Examples V1 to V10 were each granules comprising the components (A1), (B1) and a graft copolymer of (C$^a$) to (C$^h$), which were prepared in the melt at 250° C. They contained 28.16% by weight of a methyl methacrylate polymer (A1), prepared from methyl methacrylate (MMA) and methyl acrylate (MA) in the ratio 94:6 (n$_D$25=1.492, M$_w$=110,000 g/mol);

35.84% by weight of a copolymer (B1), prepared from styrene and acrylonitrile in the ratio 81:19 (weight average M$_w$=250,000 g/mol; n$_D$25=1.575), having a viscosity number of 100, determined in a 0.5% strength solution in dimethylformamide at 23° C.;

36% by weight of a graft copolymer (C$^a$) to (C$^h$) or CV1 to CV10.

The components (A1) and (B1) formed the matrix and the components (C$^a$) to (C$^h$) or CV1 to CV10 constituted the rubber. The matrix had a refractive index (n$_D$-A+n$_D$-B) of 1.5400.

Table 2 below shows, for the novel Examples 1 to 3 and for the Comparative Examples V1 to V7, the particular ratio (C2):(C3), the refractive indices of the first graft shell (n$_D$-C2), those of the second graft shell (n$_D$-C3) and those of the total graft shell (n$_D$-C2+n$_D$-C3) and the particular refractive indices of the core (n$_D$-C1) and of the total component C (n$_D$-C) and the magnitude of the difference between the refractive index of the total component C (n$_D$-C) and that of the total matrix (n$_D$-A+n$_D$-B).

TABLE 2

|  | (C2):(C3) | n$_D$ − C2 | n$_D$ − C3 | n$_D$ − C2 + n$_D$ − C3 | n$_D$ − C1 | n$_D$ − C | n$_D$ − C − (n$_D$ − A + n$_D$ − B) |
|---|---|---|---|---|---|---|---|
| Example 1 | 2:1 | 1.5422 | 1.4844 | 1.5223 | 1.5394 | 1.5345 | 0.0055 |
| Example 2 | 1:1 | 1.5422 | 1.4844 | 1.5133 | 1.5394 | 1.5289 | 0.0111 |
| Example 3 | 1:2 | 1.5422 | 1.4844 | 1.5040 | 1.5394 | 1.5288 | 0.0112 |
| Comparative Example V1 | 5:1 | 1.5422 | 1.4844 | 1.5324 | 1.5394 | 1.5373 | 0.0027 |
| Comparative Example V2 | 1:5 | 1.5422 | 1.4844 | 1.4942 | 1.5394 | 1.5258 | 0.0142 |

TABLE 2-continued

|  | (C2):(C3) | $n_D - C2$ | $n_D - C3$ | $n_D - C2 + n_D - C3$ | $n_D - C1$ | $n_D - C$ | $n_D - C - (n_D - A + n_D - B)$ |
|---|---|---|---|---|---|---|---|
| Comparative Example V3 | — | 1.5321 | — | 1.5321 | 1.5394 | 1.5372 | 0.0028 |
| Comparative Example V4 | 1:1 | 1.5370 | 1.5405 | 1.5487 | 1.5394 | 1.5431 | 0.0031 |
| Comparative Example V5 | 2:1 | 1.5422 | 1.4890 | 1.5244 | 1.5394 | 1.5349 | 0.0051 |
| Comparative Example V6 | 1:1 | 1.5939 | 1.5405 | 1.5672 | 1.5200 | 1.5389 | 0.0011 |
| Comparative Example V7 | 1:1.05 | 1.5794 | 1.4890 | 1.5331 | 1.5394 | 1.5365 | 0.0035 |

Table 3 below shows, both for the novel Examples 1 to 3 and for the Comparative Examples V1 to V7, the impact resistance $a_N$, the multiaxial impact resistance $W_g$, the melt volume index MVI, the transmittance t, the haze and the yellowness index YI.

The novel molding materials of Examples 1 to 3 are resistant to stress cracking and have a light transmittance of more than 88% and a haze of less than 4% in combination with a high level of impact resistance and good flow behavior.

TABLE 3

|  | $a_N$ [kj/m²] | $W_g$ [Nm] | t [%] | Haze [%] | YI | MVI 220° C./10 kg [ml/g] |
|---|---|---|---|---|---|---|
| Example 1 | 39.8 | 18 | 90 | 3.3 | 3.5 | 2.6 |
| Example 2 | 36.0 | 15 | 90 | 1.9 | 2.7 | 2.9 |
| Example 3 | 37.6 | 11.5 | 89.0 | 3.2 | 3.2 | 2.8 |
| Comparative Example V1 | 31.9 | 10.7 | 82.3 | 8.5 | 7.1 | 2.1 |
| Comparative Example V2 | 27.2 | 1.2 | 88.7 | 2.4 | 4.0 | 2.8 |
| Comparative Example V3 | 39.9 | 20.7 | 87.8 | 5.8 | 5.9 | 1.1 |
| Comparative Example V4 | 44.8 | 4.3 | 85.5 | 5.7 | 6.5 | 2.6 |
| Comparative Example V5 | 32.6 | 17.8 | 83.7 | 12.0 | 8.6 | 1.4 |
| Comparative Example V6 | 41.7 | 14.3 | 71.1 | 25.2 | 17.9 | 1.7 |
| Comparative Example V7 | 42.5 | 6.1 | 86.3 | 3.7 | 5.6 | 2.3 |

In the novel Examples 4 to 8 and the Comparative Example V8, the amounts of the bases (I), (II) or (III) described in Table 4 below were initially taken and, after blanketing with nitrogen, the comonomers of the first graft shell (C2) shown in Table 1, were added at 70° C., 0.5 part by weight of paraffin sulfonate and 0.2 part by weight of potassium peroxodisulfate being added, based on the amount of graft comonomer. After about 15 minutes, the comonomers of the second graft shell (C3) which are described in Table 4 below were added and polymerization was carried out to a conversion of at least 98%.

TABLE 4

Preparation of graft copolymers $C^d$ to $C^h$ and CV8 to CV10

| According to the invention | For comparison | Base (C1) No. | Amount | 1st graft shell (C2) S | MMA | BA | BDA | 2nd graft shell (C3) MMA | BA | S |
|---|---|---|---|---|---|---|---|---|---|---|
| $C^d$ |  | (I) | 226 | 5.7 | 5.2 |  | 0.1 | 8 | 2 |  |
| $C^e$ |  | (I) | 200 | 10 | 9.8 |  | 0.2 | 8 | 2 |  |
| $C^f$ |  | (I) | 200 | 14 | 5.8 |  | 0.2 | 8 | 2 |  |
| $C^g$ |  | (I) | 200 | 16 | 3.8 |  | 0.2 | 8 | 2 |  |
| $C^h$ |  | (I) | 170 | 12.5 | 12.3 |  | 0.2 | 13.5 | 1.5 |  |
|  | CV5 | (I) | 200 | 10.4 | 9.4 |  | 0.2 | 10 |  |  |
|  | CV6 | (II) | 170 | 18 |  | 1.8 | 0.2 | 10 |  | 10 |
|  | CV8 | (III) | 143 | 30 |  |  |  | 19.6 | 0.4 |  |

Table 5 shows the amounts of each of the bases or each of the comonomers in parts by weight.

The graft copolymers obtained were then isolated by precipitation, washed with water at 60° C. and then dried for 24 hours under reduced pressure.

The graft copolymers were then reacted in a melt at 250° C. with the components (A1) and (B1) to give thermoplastic molding materials.

Table 5 below shows the compositions of each of the graft copolymers $C^d$ to $C^h$ and CV8 to CV10.

Table 5

Composition of the graft copolymers ($C^d$) to ($C^h$) and CV8 to CV10 in each case in parts by weight—

$C^d$: 79 of $C1_I$ (=core) comprising 73 of Bu and 27 of S 11 of $C2^d$ (=first graft shell) comprising 52 of S, 47 of MMA and 1 of BDA 10 of $C3^d$ (=second graft shell) comprising 80 of MMA and 20 of BA $C^e$: 70 of $C1_I$ 20 of $C2^e$ comprising 50 of S, 49 of MMA and 1 of BDA 10 of $C3^e$ comprising 80 of MMA and 20 of BA $C^f$: 70 of $C1_I$ 20 of $C2^f$ comprising 70 of S, 29 of MMA and 1 of BDA 10 of $C3^f$ comprising 80 of MMA and 20 of BA $C^g$: 70 of $C1_I$ 20 of $C2^g$ comprising 80 of S, 19 of MMA and 1 of BDA 10 of $C3^g$ comprising 80 of MMA and 20 of BA $C^h$: 60 of $C1_I$ 25 of $C2^h$ comprising 50 of S, 49 of MMA and 1 of BDA 15 of $C3^h$ comprising 90 of MMA and 10 of BA CV8: 50 of $C1_{III}$ comprising 76 of Bu and 24 of S 30 of $C2_{V8}$ comprising 30 of S 20 of $C3_{V8}$ comprising 98 of MMA and 2 of BA In Table 6 below, the ratios of styrene to methyl methacrylate, the magnitude of the difference between the refractive index of the total shell C2+C3 ($n_D$-C2+$n_D$C3) and that of the core C1 ($n_D$-C1) and the magnitude of the difference between the refractive index of the total component C ($n_D$-C) and that of the total matrix A+B ($n_D$-A+$n_D$-B) are shown for the novel Examples 4 to 8 and for the Comparative Examples V5, V6 and V8.

TABLE 6

|  | Ratio styrene:MMA | ($n_D$ − C2 + $n_D$ − C3) − ($n_D$ − C1) | ($n_D$ − C) − ($n_D$ − A + $n_D$ − B) |
|---|---|---|---|
| Example 4 | 27:73 | 0.025 | 0.006 |
| Example 5 | 17:83 | 0.018 | 0.006 |
| Example 6 | 46:54 | 0.004 | 0.002 |
| Example 7 | 53:47 | 0.008 | 0.000 |
| Example 8 | 31:69 | 0.019 | 0.008 |
| Comparative Example V5 | 35:65 | 0.015 | 0.005 |
| Comparative Example V6 | 45:55 | 0.047 | 0.001 |
| Comparative Example V8 | 60:40 | 0.013 | 0.004 |

Table 7 below shows the impact resistance $a_N$, the multiaxial impact resistance Wg, the transmittance t, the haze, the yellowness index YI, the edge yellowness and the melt volume index MVI, both for the novel Examples 4 to 8 and for the Comparative Examples V5, V6 and V8.

The novel molding materials of Examples 4 to 8 have high impact resistance, are transparent and flowable and have little haze, a low yellowness index and little edge yellowness.

TABLE 7

|  | $a_N$ [kJ/m$^2$] | Wg [NM] | t [%] | Haze [%] | YI | Edge yellowness* | MVI 220° C./10 kg [ml/g] |
|---|---|---|---|---|---|---|---|
| Example 4 | 39.8 | 14.5 | 88.5 | 3.5 | 3.0 | 0–1 | 2.9 |
| Example 5 | 37.3 | 17.5 | 89.8 | 3.4 | 3.5 | 1 | 2.8 |
| Example 6 | 42.0 | 16.4 | 88.5 | 2.9 | 3.1 | 0 | 2.6 |
| Example 7 | 42.5 | 14.6 | 89.3 | 3.5 | 2.7 | 0 | 2.8 |
| Example 8 | 38.7 | 14.8 | 88.8 | 2.4 | 3.4 | 0 | 2.4 |
| Comparative Example V5 | 32.6 | 17.8 | 83.7 | 12.0 | 8.6 | ∆ | 1.4 |
| Comparative Example V6 | 41.7 | 14.3 | 71.1 | 25.2 | 17.9 | ∆ | 1.7 |
| Comparative Example V8 | 37.6 | 12.1 | 85.1 | 4.6 | 6.4 | 5 | 1.8 |

*Edge yellowness, visual perception
0 imperceptible
1 scarcely perceptible
3 moderately perceptible
5 clearly perceptible
■ owing to the poor level of the general optical properties, the edge yellowness cannot be assessed

We claim:

1. A thermoplastic molding material containing a mixture of (A) from 10 to 60% by weight of a methyl methacrylate polymer obtainable by polymerizing a mixture consisting of
(A1) from 90 to 100% by weight, based on (A), of methyl methacrylate and
(A2) from 0 to 10% by weight, based on (A), of a $C_1$–$C_8$- alkyl ester of acrylic acid
and
(B) from 10 to 70% by weight of a copolymer obtainable by polymerizing a mixture consisting of
(B1) from 75 to 88% by weight, based on (B), of a vinyl-aromatic monomer and
(B2) from 12 to 25% by weight, based on (B), of a vinyl cyanide
and
(C) from 15 to 50% by weight of a graft copolymer obtainable from
(C1) from 40 to 80% by weight, based on (C), of a core obtainable by polymerizing a monomer mixture consisting of
(C11) from 65 to 90% by weight of a 1,3-diene and
(C12) from 10 to 35% by weight of a vinylaromatic monomer
and
(C2) from 10 to 30% by weight, based on (C), of a first graft shell obtainable by polymerizing a monomer mixture consisting of (where the individual stated percentages C21, C22 and C23 sum to 100% by weight)
(C21) from 30 to 60% by weight of a vinylaromatic monomer,
(C22) from 40 to 60% by weight of a $C_1$–$C_8$-alkyl ester of methacrylic acid and
(C23) from 0 to 2% by weight of a crosslinking monomer
and
(C3) from 10 to 30% by weight, based on (C), of a second graft shell obtainable by polymerizing a monomer mixture consisting of
(C31) from 70 to 98% by weight of a $C_1$–$C_8$-alkyl ester of methacrylic acid and
(C32) from 2 to 30% by weight of a $C_1$–$C_8$-alkyl ester of acrylic acid,
the individual stated percentages of A, B and C in the mixture summing to 100% by weight, and
(D) optionally, conventional additives in amounts of up to 20% by weight, based on the sum of the components A, B and C,
with the provisos that the ratio of (C2) to (C3) is from 2:1 to 1:2, the refractive index of the first graft shell ($n_D$–C2) is greater than the refractive index of the second graft shell ($n_D$-C3) and the refractive index of the total graft shell ($n_D$-C2+$n_D$-C3) is less than the refractive index of the core ($n_D$-C1), the magnitude of the difference between the refractive index of the total component C ($n_D$-C) and that of the total matrix ($n_D$-A+$n_D$-B) is less than or equal to 0.02.

2. A thermoplastic molding material as claimed in claim 1, in which the magnitude of the difference between the refractive index of the total graft shell of the graft copolymer C and that of the core is less than 0.03.

3. A thermoplastic molding material as claimed in claim 1, containing a mixture of (A) from 20 to 50% by weight of a methyl methacrylate polymer comprising a methyl methacrylate (A1) and a $C_1$–$C_8$-alkyl ester of acrylic acid (A2) and (B) from 20 to 40% by weight of a copolymer of a vinyl aromatic monomer (B1) and vinyl cyanide (B2) and (C) from 20 to 40% by weight of a graft copolymer comprising a core (C1), a first graft shell (C2) and a second graft shell (C3), the stated percentages of A, B and C summing to 100% by weight, and (D) if required, conventional additives.

4. A thermoplastic molding material as claimed in claim 1, wherein the vinyl aromatic monomer used is styrene.

5. A thermoplastic molding material as claimed in claim 1, wherein the graft copolymer (C) has a swelling index SI of from 10 to 40.

6. A process for the preparation of a thermoplastic molding material as claimed in claim 1, wherein (A) from 10 to 60% by weight of a methyl methacrylate polymer obtainable by polymerizing a mixture consisting of
  (A1) from 90 to 100% by weight, based on (A), of methyl methacrylate and
  (A2) from 0 to 10% by weight, based on (A), of a $C_1$–$C_8$-alkyl ester of acrylic acid and (B) from 10 to 70% by weight of a copolymer obtainable by polymerizing a mixture consisting of
  (B1) from 75 to 88% by weight, based on (B), of a vinylaromatic monomer and
  (B2) from 12 to 25% by weight, based on (B), of a vinyl cyanide
and (C) from 15 to 50% by weight of a graft copolymer obtainable from
  (C1) from 40 to 80% by weight, based on (C), of a core obtainable by polymerizing a monomer mixture consisting of
    (C11) from 65 to 90% by weight of a 1,3-diene and
    (C12) from 10 to 35% by weight of a vinyl aromatic monomer
and (C2) from 10 to 30% by weight, based on (C), of a first graft shell obtainable by polymerizing a monomer mixture consisting of (where the individual stated percentages C21, C22 and C23 sum to 100% by weight)
  (C21) from 30 to 60% by weight of a vinylaromatic monomer,
  (C22) from 40 to 60% by weight of a $C_1$–$C_8$-alkyl ester of methacrylic acid and
  (C23) from 0 to 2% by weight of a crosslinking monomer
and (C3) from 10 to 30% by weight, based on (C), of a second graft shell obtainable by polymerizing a monomer mixture consisting of
  (C31) from 70 to 98% by weight of a $C_1$–$C_8$-alkyl ester of methacrylic acid and
  (C32) from 2 to 30% by weight of a $C_1$–$C_8$-alkyl ester of acrylic acid, the stated percentages of A, B and C summing to 100% by weight, and (D) optionally, conventional additives in amounts of up to 20% by weight, based on the sum of the components A, B and C, with the provisos that the ratio of (C2) to (C3) is from 2:1 to 1:2, the refractive index of the first graft shell ($n_D$-C2) is greater than the refractive index of the second graft shell ($n_D$-C3) and the refractive index of the total graft shell ($n_D$-C2+$n_D$-C3) is less than the refractive index of the core ($n_D$-C1), the magnitude of the difference between the refractive index of the total component C ($n_D$-C) and that of the total matrix ($n_D$-A+$n_D$-B) being less than or equal to 0.02, are mixed by a method in which the components (A), (B), (C) and, if required, (D) are mixed in the melt at from 200 to 300° C.

7. Process in which the thermoplastic molding material as claimed in claim 1 is molded.

8. A molding obtainable from one of the thermoplastic molding materials as claimed in claim 1.

* * * * *